United States Patent [19]
Preti

[11] 4,244,183
[45] Jan. 13, 1981

[54] CONTROL MEANS FOR AN AUGMENTOR FOR A GAS TURBINE ENGINE

[75] Inventor: Edmond Preti, North Palm Beach, Fla.

[73] Assignee: United Technologies Corporation, Hartford, Conn.

[21] Appl. No.: 900,679

[22] Filed: Apr. 27, 1978

[51] Int. Cl.² ............................................... F02K 3/08
[52] U.S. Cl. ...................................... 60/224; 60/241; 60/243
[58] Field of Search ................ 60/224, 241, 243, 261, 60/262

[56] References Cited
U.S. PATENT DOCUMENTS

| | | | |
|---|---|---|---|
| 3,020,717 | 2/1962 | Pearce | 60/39.28 R |
| 3,174,281 | 3/1965 | Zeisloft | 60/241 |
| 3,204,404 | 9/1965 | Barger et al. | 60/39.28 R |
| 3,331,204 | 7/1967 | Love | 60/241 |
| 3,402,556 | 9/1968 | Lavash et al. | 60/241 |
| 4,095,420 | 6/1978 | Abernethy et al. | 60/204 |

*Primary Examiner*—Louis J. Casaregola
*Attorney, Agent, or Firm*—Norman Friedland

[57] ABSTRACT

This invention serves to improve augmentor effectiveness of a turbine fan engine that has a bypass airstream and a core stream by synthesizing signals indicative of both the airflow of the bypass stream and core stream and directly scheduling fuel/air ratio for both streams and ascertaining the desired fuel flow to be used to meter fuel to each of the streams.

9 Claims, 4 Drawing Figures

CONTROL MEANS FOR AN AUGMENTOR FOR A GAS TURBINE ENGINE

The Government has rights in this invention pursuant to Contract No. F33657-70-C-0600 awarded by the Department of the Air Force.

BACKGROUND OF THE INVENTION

This invention relates to the augmentor of a turbofan engine and particularly to fuel control means therefor.

Heretofore, the fuel admitted to the agumentor was controlled by utilizing an engine control parameter that sets up a value indicative of $W_f/P_3$: Where $W_f$ is fuel flow in pounds/hour and $P_3$ is compressor discharge air pressure in psia. This value in essence serves as a rough estimate of the fuel/air ratio in the aurgmentor, but in reality is not deemed a valid indication thereof. While such a control parameter for many purposes is practical and still is employed, it has its shortcomings inasmuch as it does not lend itself to account for some of the adverse conditions inherent in the augmentors.

I have found that I can improve augmentor effectiveness by controlling the fuel to the hot and cold sections of the augmentor by developing a signal for each of the fuel values in these sections indicative of the hot and cold fuel/air ratio. In one embodiment, it is contemplated that the air flow in the hot section (core air) and the airflow in the cold section, fan bypass air, is synthesized and the fuel/air ratio is calculated to control the segmented fuel nozzles in each of the sections. In another preferred embodiment, the core airflow is similarly synthesized and, however, the total engine airflow is synthesized. The two are subtracted and the difference is the cold airflow. Similarly, the fuel/air ratio is calculated to provide improved fuel control schedule to the augmentor. The fact that fuel air ratio is utilized as the control parameter affords a host of potential augmentor improvements. For example, the augmentor can now avoid rumble, poor ignition and durability limits. Transient variations in bypass ratio are compensated for and a constant f/A is maintained.

SUMMARY OF THE INVENTION

A feature of this invention is to control fuel flow to the hot and cold sections of an augmentor attached to a mixed turbofan engine as a function of fuel air ratio in both the hot and cold sections.

A further feature is to provide in an augmentor as described, fuel control means that synthesizes airflow in the cold and hot sections and with the derivative calculate fuel/air ratios for these sections and developing a fuel flow schedule to ultimately control fuel flow. Such a control affords the opportunity for the augmentor fuel control to account for a host of undesirable conditions such as rumble and enhances the durability thereof.

Other features and advantages will be apparent from the specification and claims and from the accompanying drawings which illustrate an embodiment of the invention.

DESCRIPTION OF THE PREFERRED EMBODIMENT

While this invention is shown as being used with a twin-spool axial flow turbofan engine with an augmentor, it is to be understood that any type of engine may equally utilize this invention. As will be appreciated from the following description, this invention is essentially concerned with scheduling the fuel flow to the augmentor so that fuel to the hot and cold air portions of the augmentor is controlled independently of each other and as a function of the fuel air ratio of the hot and cold sections. Suffice it to say, therefore, that any engine that has hot and cold airstreams admitted to the augmentor could utilize this invention. Additionally, as one skilled in the art will appreciate in a jet engine that does not include a fan for mixing colder streams, it is contemplated within the scope of the invention that a fuel/air ratio could be synthesized to obtain improved fuel metering to the augmentor.

Figure 1:
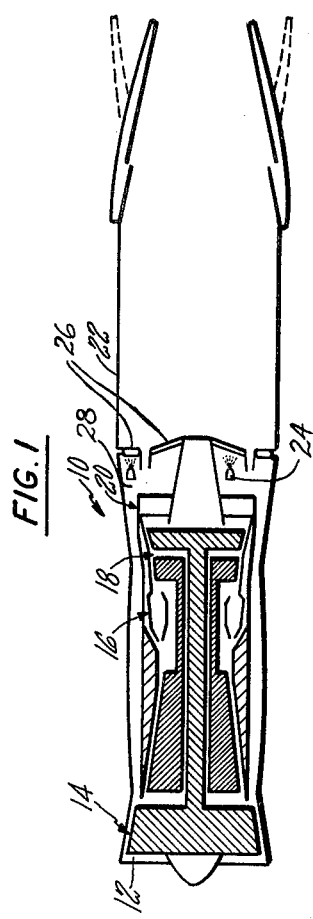
FIG. 1 is a schematic illustration of a fan/jet engine with augmentor.

As noted in FIG. 1, the engine generally represented by reference numeral 10 comprises an inlet 12, a fan/compressor and high compressor section 14, burner section 16, turbine section 18 and mixer 20. An augmentor 22 that augments thrust developed in the core engine is attached to the rear end and comprises segmented fuel nozzles 24 mounted between mixer 20 and flameholders 26. The air discharging from the low spool fan/compressor is divided so that a portion passes to the core engine and the remaining portion bypasses the core engine in the annular passageway or duct 28. Obviously, a portion of augmentor 22 will see a hot stream and another portion will see a cold stream relative to each other. As will be described in more detail hereinbelow by using measured engine parameters and known parameter relationships, the airflow in the core stream (hot) and duct stream 28 (cold) is calculated. With these values ascertained, the fuel to the fuel nozzles can be regulated by scheduling the hot and cold streams fuel/air ratio. This results in regulating fuel flow to the augmentor and accounting for all engine requirements during the entire aircraft's flight envelope. Additionally, the benefits derived from scheduling fuel/air ratio optimize performance, enhances smooth fuel segment transfers and minimizes augmentor rumble.

Figure 2:
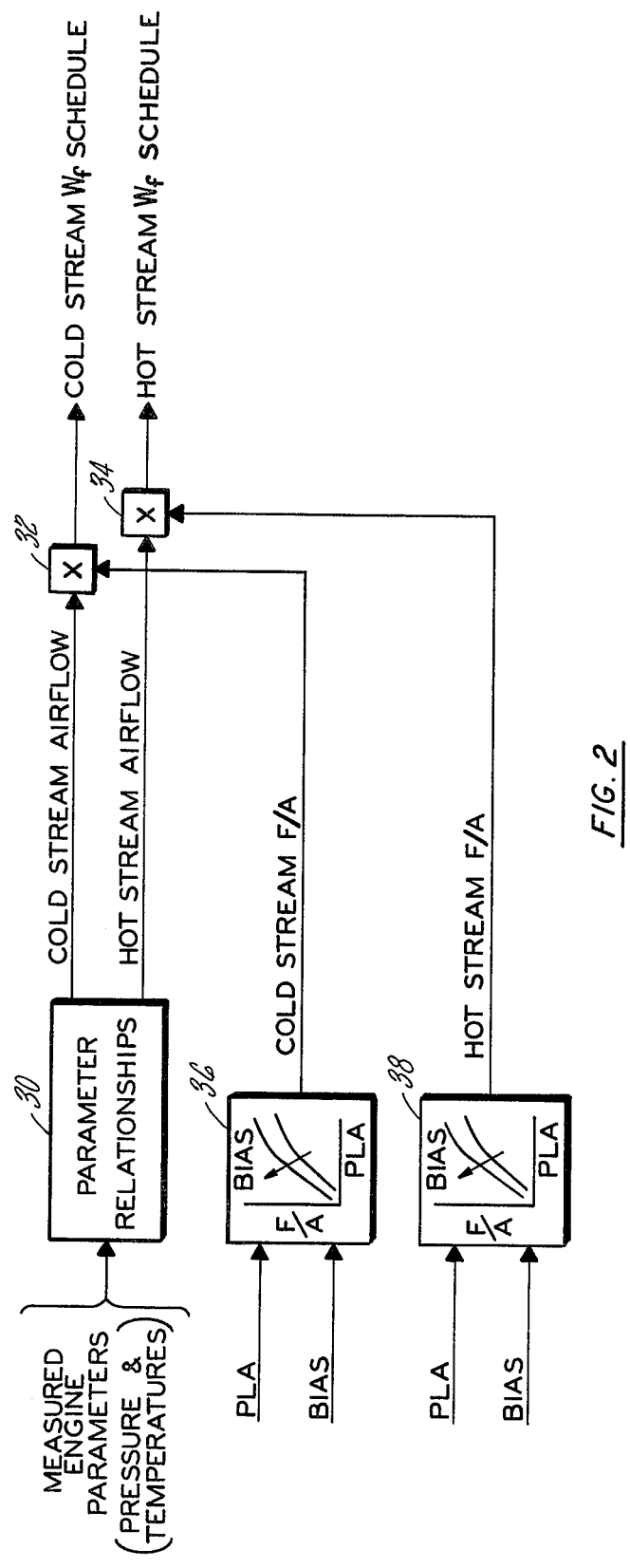
FIG. 2 is a block diagram representative of the basic concept of this invention.

The invention can best be described by first referring to FIG. 2 which basically shows the essence of the invention. Box 30 represents the calculations made from sensed engine parameters to obtain synthesized airflow values of the cold and hot streams. These values are applied to the multipliers 32 and 34 respectively that multiplies the calculated fuel/air ratio of the cold and hot streams respectively. Knowing the engine characteristics, it is possible to obtain a simulated value of the actual engine fuel/air ratio in both streams by measuring the position of the power lever. Obviously, each engine model will have different characteristics and it may be desirable to control different operational conditions in the augmentor as, for example, augmentor rumble, start up requirements and the like all of which can be taken into consideration by biasing with a suitable parameter the power lever position signal. Boxes 36 and 38 represent suitable function generators that produce as their outputs fuel/air ratio signals for both the cold and hot streams as functions of power lever position (PLA). This value, as shown, can be biased by any parameter to achieve the control requirements desired. The outputs from multipliers 32 and 34 are the scheduled values of fuel flow for both the cold and hot stream. Although not shown these signals are then utilized to control the fuel flow to the segmented nozzles in the augmentor.

Figure 3:
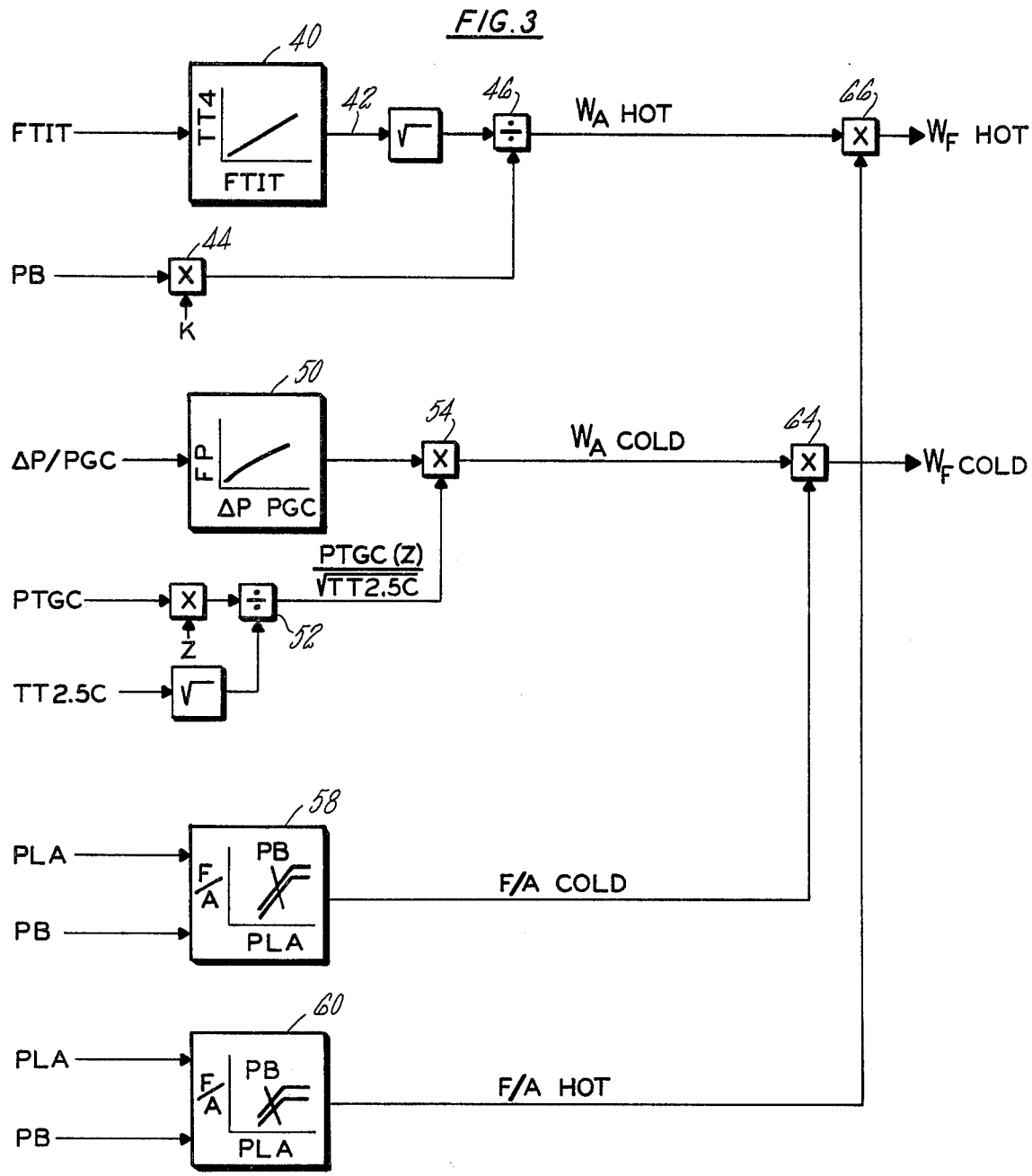
FIG. 3 is a block diagram illustrating one embodiment of the invention.

FIG. 3 represents a block diagram of one of the preferred embodiments and describes in more detail how to calculate the fuel/air ratios. As can be seen, function generator 40 produces an output signal represented by box 42 indicative of turbine inlet temperature $T_T4$ of the high spool which is a function of turbine inlet temperature of the low spool Ftit. Burner pressure (PB) is multiplied in suitable multiplier 44 by a constant K. K is the value achieved by adding the compressible flow parameter obtained by the formula below, the flow area at the high turbine and the percent of cooling air that was bled from the compressor and dumped back into the core stream. Obviously, the percent of cooling air will be zero if no cooling is utilized.

The compressible flow parameter for a gas turbine cycle is well known and would require a rigorous mathematical calculation to show its derivation. Suffice it to say that it is obtained by solving for the following equation.

$K_1 = FP_{NT}$ = high turbine flow parameter
$A_{HT}$ = area of high turbine flow area $$\frac{Wa\sqrt{T_T}}{AP_T} = \frac{M\sqrt{\gamma g/R}\sqrt{1 + \frac{\gamma-1}{2}M^2}}{(1 + \frac{\gamma-1}{2}M^2)\frac{\gamma}{\gamma-1}}$$

SYMBOLS

Wa = air flow #/sec.
$T_T$ = total temp. °R.
A = area
$P_T$ = total pressure PSFA (pounds per square foot)
$\gamma$ = ratio of specific heat
M = Mach No.
R = gas constant Ft/lb/lb°F.
g = gravitational constant
FTIT = fan turbine inlet temp.
$T_T4$ = turbine inlet total temperature
$\Delta P$ = pressure difference across fan and compressors
PGC = pressure of the gas generator compressor
PTGC = total pressure of gas generator compressor
TT2.5C = total temperature at the 2.5 station (between fan/compressor section and high spool compressor section)
PS2 = static pressure at the inlet of fan/compressor section
PT2 = total pressure at the inlet of fan/compressor station
PB = burner pressure
PLA = power lever angle
TT2 = total temperature at inlet of fan/compressor section
PT6M = total pressure at the fuel nozzle station of the augmentor
F/A = fuel air ratio
MV = fuel metering valve
WATOT = total airflow The output of multiplier 44 is applied to the suitable divider 46 that divides the square root of the $T_T4$ signal which was processed in the square root calculator box 48. The output of divider 46 therefore is a similar value of the airflow (Wa) of the core or hot stream.

The cold stream airflow (Wa) is similarly synthesized by the logic showing the cold stream Wa output signal. The signal generator 50 produces an output signal indicative of the pressure at the engine station 6 where the augmentor nozzles 24 are located. Hence, a pressure which may be the $\Delta P/P$ at that station is sensed and processed to generate a signal indicative of the fuel pressure at that station. This value is then multiplied by a signal indicative of the total pressure (PT6) at this station and the total temperature at the inlet ($T_T2.5$). As noted, PT6 is multiplied by constant Z which is equal to the flow area of station 6 and then divided by the square root of the value of $T_T2.5$ in divider 52. The outputs from box 50 and divider 52 are multiplied by suitable multiplier 54 and this product is indicative of the simulated cold airflow.

The logic calculates the fuel/air ratio as is described hereinbelow. PLA is sensed and admitted to function generators 58 and 60. As noted, this signal is biased by burner pressure (PB). Hence the function generator 58 produces a synthesized fuel/air ratio signal for the cold stream and function generator 60 produces a synthesized fuel/air ratio signal for the hot stream. Both of these signals are then multiplied by the synthesized airflows of the hot and cold streams in multipliers 64 and 66 respectively. The output from multiplier 66 is indicative of scheduled fuel flow for the hot stream and the output of multiplier 64 is the scheduled fuel flow for the cold stream.

Figure 4:
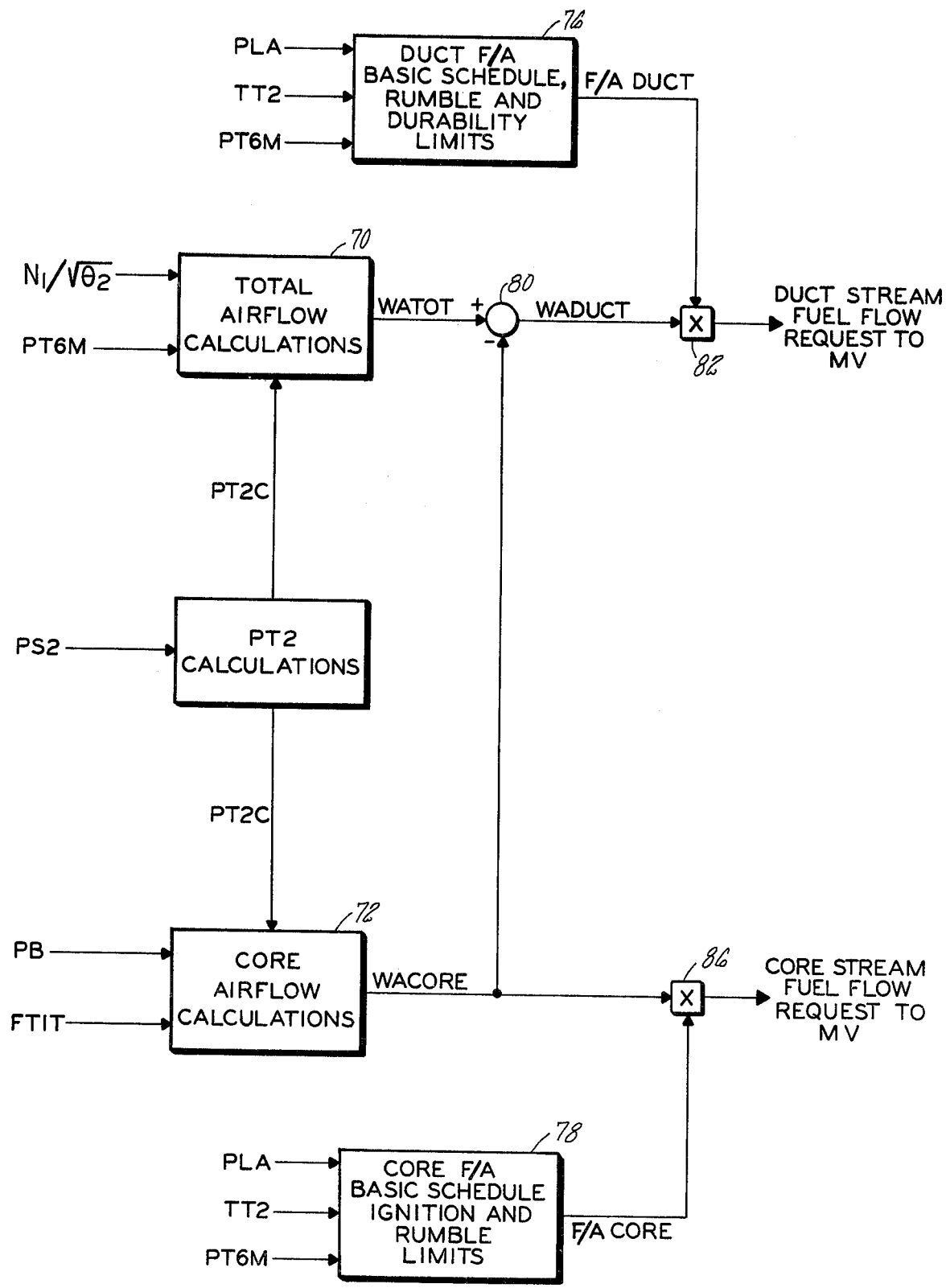
FIG. 4 is a block diagram illustrating another embodiment of the invention.

FIG. 4 exemplifies another representation of an embodiment of this invention. As noted above, each of the synthesized airflows for the hot stream and cold stream were calculated independently. In this embodiment, the airflow for the core engine (hot) and the total airflow for the engine is calculated, and the difference, the cold stream, is obtained by subtracting one from the other.

Box 70 is a function generator and from the well known compressor map generates a signal indicative of total airflow (WaTot). These calculations are well known and for the sake of simplicity and convenience, the details for obtaining the calculation are being omitted herefrom. Suffice it to say that for constant speed lines, it is relatively simple to obtain the engine airflow from a compressor map if you know corrected speed (N/θ) and the compressor pressure ratio. The box 72 is another function generator that provides the total pressure at the inlet of the compressor (PT2) and is only necessary to avoid measuring the total pressure since it is easier to measure the static pressure and convert it to a total pressure value.

The core airflow is calculated similarly to the calculations shown in FIG. 3. Box 72 represents the hot airflow (Wa core) synthesized by calculating P6 and FTiT. Again as was done in FIG. 3, the fuel air ratio for both the hot and cold streams are synthesized. This is represented by boxes 76 and 78 respectively. As noted, boxes 76 and 78 respond to PLA which is biased by TT2 and PT6 values which not only give the desired fuel/air schedule, it provides rumble and durability limits. The output from function generator 70 (Wa TOT) is added to the output of function generator 72 at the summing junction 80. Then, essentially subtract the hot stream airflow value from the total airflow resulting in the value of the cold stream airflow. This value is multiplied by the output of the calculated synthesized fuel- /air ratio of the cold stream in multiplier 82 to produce a schedule cold stream fuel flow signal.

The synthesized airflow of the hot stream is multiplied by the synthesized fuel/air ratio by multiplier 86 to produce a schedule hot stream fuel flow signal means for synthesizing the hot and cold airstream which enables one to schedule af/a ratio.

It should be understood that the invention is not limited to the particular embodiments shown and described herein, but that various changes and modifications may be made without departing from the spirit or scope of this novel concept as defined by the following claims.

I claim:

1. For a turbofan engine having an augmentor receiving both cooler fan air and hotter core air and fuel nozzles in the augmentor disposed in both the hot air and cooler airstreams, means for producing independent schedules for the fuel in said nozzles disposed in the hot airstream and cooler airstream, said scheduling means including first function generating means responsive to engine operating parameters for producing first and second signals indicative of hot stream airflow and cooler stream airflow, second function generating means responsive to means indicating power generated by said engine for producing third and fourth signals simulating fuel/air ratio in both the hot and cooler airstreams and means responsive to said first signal and third signal and to said second and fourth signals for producing an output signal indicative of the scheduled fuel flow to the fuel nozzles disposed in said hot airstream and said cooler airstream.

2. A system as in claim 1 where the turbofan engine includes turbines and compressors in twin spool relation such that the lower powered turbine drives the fan, the engine operating parameters being the temperature of the inlet of said lower powered turbine and the pressure and temperature of the air of the compressor.

3. A system as in claim 2 wherein said engine has associated therewith a power lever for selecting the power produced by said engine, said power indicating means being the position of said power lever.

4. A system as in claim 2 including means responsive to an engine operating parameter for further controlling said first function generator means.

5. A system as in claim 4 including additional means responsive to an engine operating parameter for further controlling said second function generator means.

6. A system as in claim 5 including a burner section wherein said engine operating parameter of said additional means is the pressure of the engine working medium.

7. For a turbofan engine having compressor and turbine sections in twin spool relationship, a burner therebetween and an augmentor receiving both cooler fan air and hotter core air and fuel nozzles in the augmentor disposed in both the hot air and cooler airstreams, means for producing independent schedules for the fuel in said nozzles disposed in the hot airstream and cooler airstream, said scheduling means including first function generating means responsive to the fan turbine inlet temperature and burner pressure for producing a first signal indicative of hot stream airflow, second function generating means responsive to compressor pressure and compressor temperature for producing a second signal indicative of the cooler stream airflow third function generating means responsive to an engine parameter indicative of the power produced by said engine for simulating the fuel air ratios of the hot airstream and the cooler airstream for producing third and fourth signals, means responsive to said first signal and third signal for producing an output signal indicative of the scheduled fuel flow to the fuel nozzles disposed in said hot airstream and means responsive to said second and fourth signals for producing an output signal indicative of the scheduled fuel flow to the fuel nozzles disposed in said cooler airstream.

8. A system as in claim 7 wherein said first signal is referenced to a constant indicative of the thermodynamic characteristics for said engine.

9. For a turbofan engine having compressor and turbine sections in twin spool relationship, a burner therebetween and an augmentor receiving the air from the core of the engine and cooler air from the fan of the engine, fuel nozzles in said augmentor disposed in the hot airstream and cooler airstream, first means for scheduling the fuel flow to said fuel nozzles disposed in said hot airstream and second means independent of said first means for scheduling fuel flow to said fuel nozzles disposed in said cooler airstream, said first means including means responsive to engine operating parameters for producing a first signal simulating the value of the airflow in the core engine and means responsive to an indication of power of said engine for producing a second signal simulating the value of the fuel air ratios in said core engine, said second means responsive to engine operating parameters for producing a third signal simulating the value of the total airflow of said engine, means for subtracting the value of the simulated airflow of the core engine from the value of said total airflow for producing a fourth signal, and means combining said first signal and said second signal for producing a first output signal indicative of the schedule of the fuel flow in said hot airstream, means responsive to engine operating parameters for producing a fifth signal simulating the value of fuel air ratios of said cooler airstream and means combining said fourth signal and said fifth signal for producing a second output signal indicative of the schedule of fuel flow in said cooler airstream.

* * * * *